United States Patent
Golyshko et al.

(12)

(10) Patent No.: US 12,513,352 B2
(45) Date of Patent: Dec. 30, 2025

(54) REMOTE CONTROL SYSTEM FOR MULTIPLE MULTIMEDIA DEVICES

(71) Applicant: Roku, Inc., San Jose, CA (US)

(72) Inventors: Philip Golyshko, Westminster, CO (US); Sunil Ramesh, Saratoga, CA (US); David Lee Stern, Los Gatos, CA (US); Patrick Brouillette, Tempe, AZ (US); Gregory Garner, Key Colony Beach, FL (US); Soren Riise, Templeton, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/671,725

(22) Filed: May 22, 2024

(65) Prior Publication Data

US 2025/0365462 A1 Nov. 27, 2025

(51) Int. Cl.
*H04N 21/41* (2011.01)
*H04N 21/422* (2011.01)

(52) U.S. Cl.
CPC ... *H04N 21/4108* (2013.01); *H04N 21/41265* (2020.08); *H04N 21/42221* (2013.01); *H04N 21/42222* (2013.01)

(58) Field of Classification Search
CPC ......... H04N 21/4108; H04N 21/41265; H04N 21/42221; H04N 21/42222
See application file for complete search history.

(56) References Cited

U.S. PATENT DOCUMENTS

| | | |
|---|---|---|
| 2004/0208588 A1 | 10/2004 | Colmenarez et al. |
| 2007/0013775 A1* | 1/2007 | Shin ........................ G08C 17/02 348/114 |
| 2007/0057914 A1* | 3/2007 | Park ........................ H04N 9/12 348/E5.103 |
| 2017/0213449 A1 | 7/2017 | Tchedikian |
| 2017/0301228 A1 | 10/2017 | Suyama |
| 2021/0224016 A1* | 7/2021 | Aoyanagi ................ G09G 3/36 |
| 2022/0156357 A1* | 5/2022 | Ko ........................... G06F 21/36 |

OTHER PUBLICATIONS

Extended European Search Report in corresponding European application No. 25177957.5 mailed Nov. 3, 2025, in 9 pages.

\* cited by examiner

*Primary Examiner* — Michael Lee
(74) *Attorney, Agent, or Firm* — Straylight LLP

(57) ABSTRACT

Aspects of the disclosed technology provide solutions for controlling multiple displays (e.g., multiple display devices, multiple displays on a media device, etc.) using a remote control device. An example method can include receiving an image of a plurality of display devices. The method can include steps for analyzing the image to determine locations of the plurality of display devices, assigning a code specific to each of the plurality of display devices based on the image, and transmitting the code to a remote control. The code enables the remote control to independently operate each of the plurality of display devices.

18 Claims, 9 Drawing Sheets

REMOTE CONTROL SYSTEM FOR MULTIPLE MULTIMEDIA DEVICES

FIELD

This disclosure is generally directed to a display system, and more particularly to solutions for controlling multiple media devices using a single remote control device.

SUMMARY

Provided herein are a system, apparatus, article of manufacture, method and/or computer program product embodiments, and/or combinations and sub-combinations thereof, for controlling multiple displays using a single remote control device. In particular, a method is provided for pairing multiple display devices with a remote control device such that the remote control device can independently control each of the multiple display devices based on a position or motion of the remote control device.

The method may be implemented by system server(s), which is configured to support display device(s) or media device(s). The method also can be implemented by display system(s) including a display device and remote control. In various examples, the method can operate in other devices such as, for example and without limitation, a mobile device, a smart television, computer, among others.

The method can include receiving an image of a plurality of display devices. The method can also include analyzing the image to determine locations of the plurality of display devices and assigning a code specific to each of the plurality of display devices based on the image. For example, a unique code can be associated with each of the plurality of display devices based on a position of the remote control. The code can be then transmitted to a remote control, in which the code enables the remote control to independently operate each of the plurality of display devices.

In some aspects, a system is provided for controlling multiple display devices or multiple displays using a remote control device. The system can include one or more memories and at least one processor coupled to at least one of the one or more memories and configured to receive an image of a plurality of display devices. The at least one processor of the system can be configured to analyze the image to determine locations of the plurality of display devices and assign a code specific to each of the plurality of display devices based on the image. For example, a unique code can be associated with each of the plurality of display devices based on a position of the remote control. The code can be then transmitted to a remote control, in which the code enables the remote control to independently operate each of the plurality of display devices.

In some aspects, a non-transitory computer-readable medium is provided for controlling multiple display devices or multiple displays using a remote control device. The non-transitory computer-readable medium can have instructions stored thereon that, when executed by at least one computing device, cause the at least one computing device to receive an image of a plurality of display devices. The instructions of the non-transitory computer-readable medium can, when executed by the at least one computing device, cause the at least one computing device to analyze the image to determine locations of the plurality of display devices and assign a code specific to each of the plurality of display devices based on the image. For example, a unique code can be associated with each of the plurality of display devices based on a position of the remote control. The code can be then transmitted to a remote control, in which the code enables the remote control to independently operate each of the plurality of display devices.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Many multimedia environments involve multiple display devices and media devices that are controlled by remote controls. Dealing with numerous control devices to manage multiple display and media devices can become frustrating. Multiple control devices not only contribute to physical clutter but also lead to user confusion and frustration for users since users may struggle to remember which device controls which function or device.

Aspects of the disclosed technology provide solutions for pairing and controlling multiple displays (e.g., multiple display devices, multiple displays on a media device, etc.) using a single (common) remote control device. In some aspects, multiple displays or display devices can be paired with a remote control by associating a unique code with each of the displays or display devices. As follows, a single remote control can be used to independently control each of the multiple displays or display devices based on a position or motion of the remote control.

In some examples, an image of multiple display devices can be used to determine the arrangement and/or locations of the display devices so that a code can be assigned to each of the display devices. For example, a user can use a mobile device, a remote control device, or any electronic device equipped with a camera to capture an image of multiple display devices. As follows, the image can be analyzed to determine an arrangement (e.g., spatial geometry), locations, positions, shapes, sizes, and/or borders of display devices. A unique code for each of multiple display devices or display zones can be used to connect a remote control device with a display device or a display zone that the remote control devices is currently trying to control, for example based on a position or motion/movement of the remote control.

As discussed in further detail below, the technologies and techniques described herein can significantly reduce the complexity, loss of productivity, and user confusion caused by having multiple control devices by providing solutions for programming or pairing multiple display devices and/or media devices with a single remote control device and controlling operations and functions of the multiple display devices and/or media devices with a single remote control device.

Figure 1:
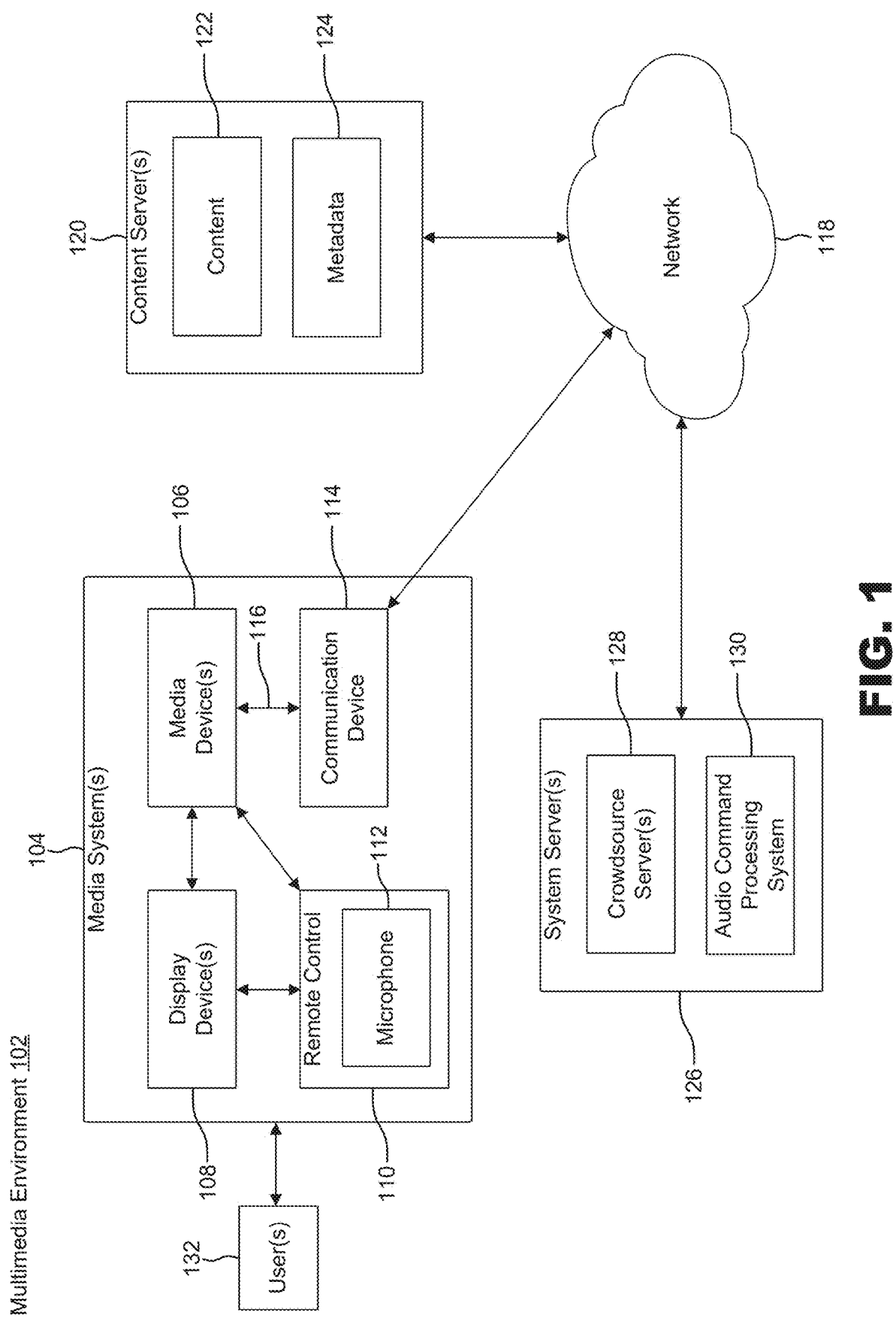
FIG. 1 illustrates a block diagram of an example multimedia environment, according to some examples of the present disclosure.

Various embodiments and aspects of this disclosure may be implemented using and/or may be part of a multimedia environment 102 shown in FIG. 1. It is noted, however, that multimedia environment 102 is provided solely for illustrative purposes and is not limiting. Examples and embodiments of this disclosure may be implemented using, and/or may be part of, environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some examples, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various examples, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In some examples, the remote control 110 wirelessly communicates with the media device 106 and/or display device 108 using cellular, Bluetooth, infrared (IR) signal, radio frequency (RF) signal, etc., or any combination thereof. The remote control 110 may include a microphone 112, which is further described below.

In some aspects, remote control 110 may include a gyroscope for measuring orientation of remote control 110, an accelerometer for measuring acceleration of remote control 110 (e.g., changes in direction), a magnetometer for measuring magnetic field (e.g., orientation of remote control 110 in relation to the Earth's magnetic field), or a combination thereof. For example, a combination of a gyroscope, an accelerometer, or a magnetometer can provide remote control 110 with motion-sensing capabilities (e.g., cursor control, motion-based interactions, etc.).

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

In some examples, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing system 130. As noted above, the remote control 110 may include a microphone 112. The microphone 112 may receive audio data from users 132 (as well as other sources, such as the display device 108). In some examples, the media device 106 may be audio responsive, and the audio data may represent verbal commands from the user 132 to control the media device 106 as well as other components in the media system 104, such as the display device 108.

In some examples, the audio data received by the microphone 112 in the remote control 110 is transferred to the media device 106, which is then forwarded to the audio command processing system 130 in the system servers 126. The audio command processing system 130 may operate to process and analyze the received audio data to recognize the user 132's verbal command. The audio command processing system 130 may then forward the verbal command back to the media device 106 for processing.

Figure 2:
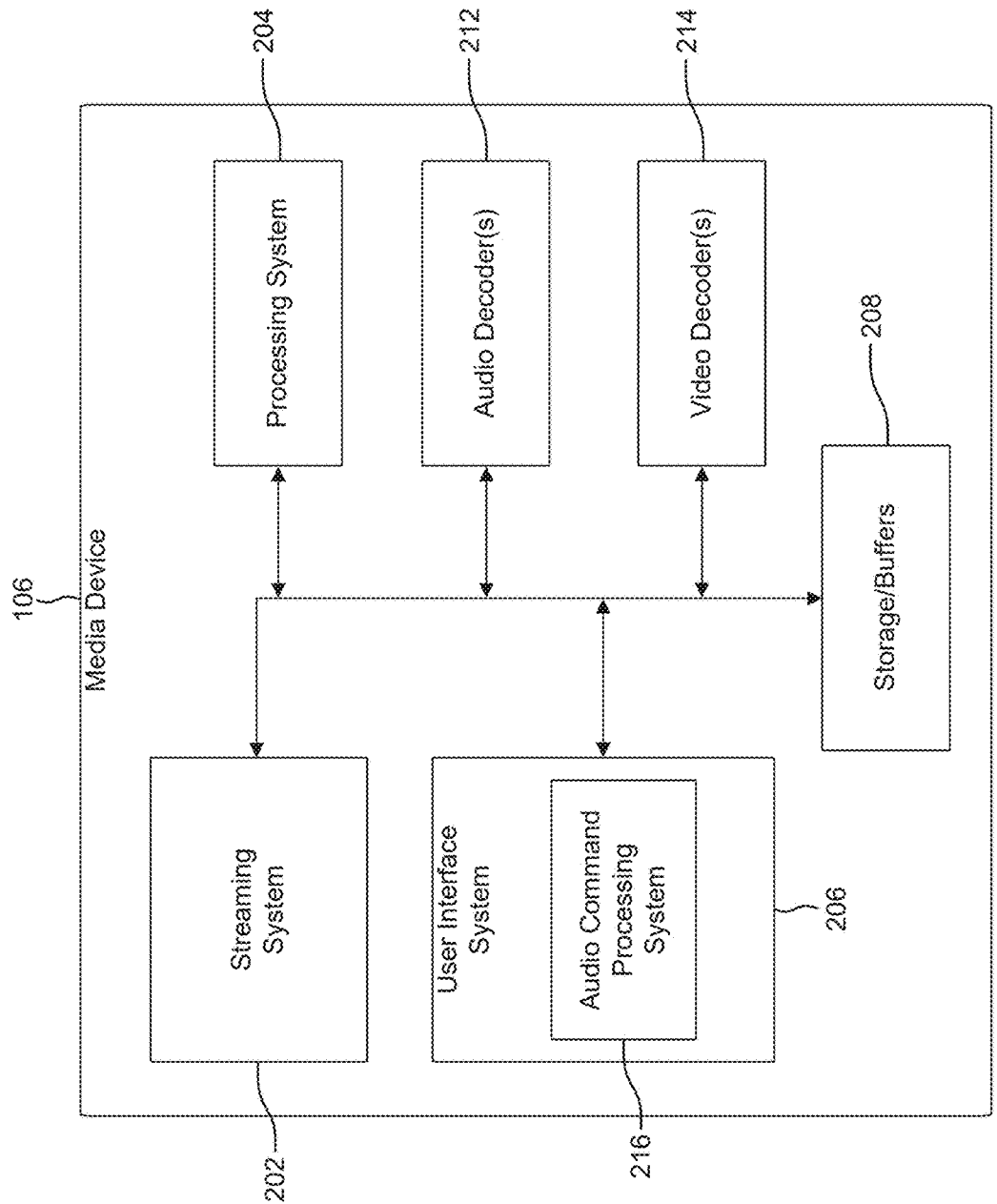
FIG. 2 illustrates a block diagram of an example streaming media device, according to some examples of the present disclosure.

In some examples, the audio data may be alternatively or additionally processed and analyzed by an audio command processing system 216 in the media device 106 (see FIG. 2). The media device 106 and the system servers 126 may then cooperate to pick one of the verbal commands to process (either the verbal command recognized by the audio command processing system 130 in the system servers 126, or the verbal command recognized by the audio command processing system 216 in the media device 106).

FIG. 2 illustrates a block diagram of an example media device 106, according to some embodiments. Media device 106 may include a streaming system 202, processing system 204, storage/buffers 208, and user interface module 206. As described above, the user interface module 206 may include the audio command processing system 216.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, VVC, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, VVC, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some examples, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming system 202 of the media device 106 may request the selected content from the content server(s) 120 over the network 118. The content server(s) 120 may transmit the requested content to the streaming system 202. The media device 106 may transmit the received content to the display device 108 for playback to the user 132.

In streaming examples, the streaming system 202 may transmit the content to the display device 108 in real time or near real time as it receives such content from the content server(s) 120. In non-streaming examples, the media device 106 may store the content received from content server(s) 120 in storage/buffers 208 for later playback on display device 108.

Remote Control System for Multiple Multimedia Devices

Referring to FIG. 1, the media system 104 and/or system server 126 can be configured to perform applicable functions related to pair and control multiple devices (e.g., media device 106 and/or display device 108) with a single remote control (e.g., remote control 110). The disclosure now continues with a further discussion of pairing and controlling multiple display devices with a remote control device such that the single remote control device can independently control operations and functions of each of the multiple display devices.

Figure 3A:
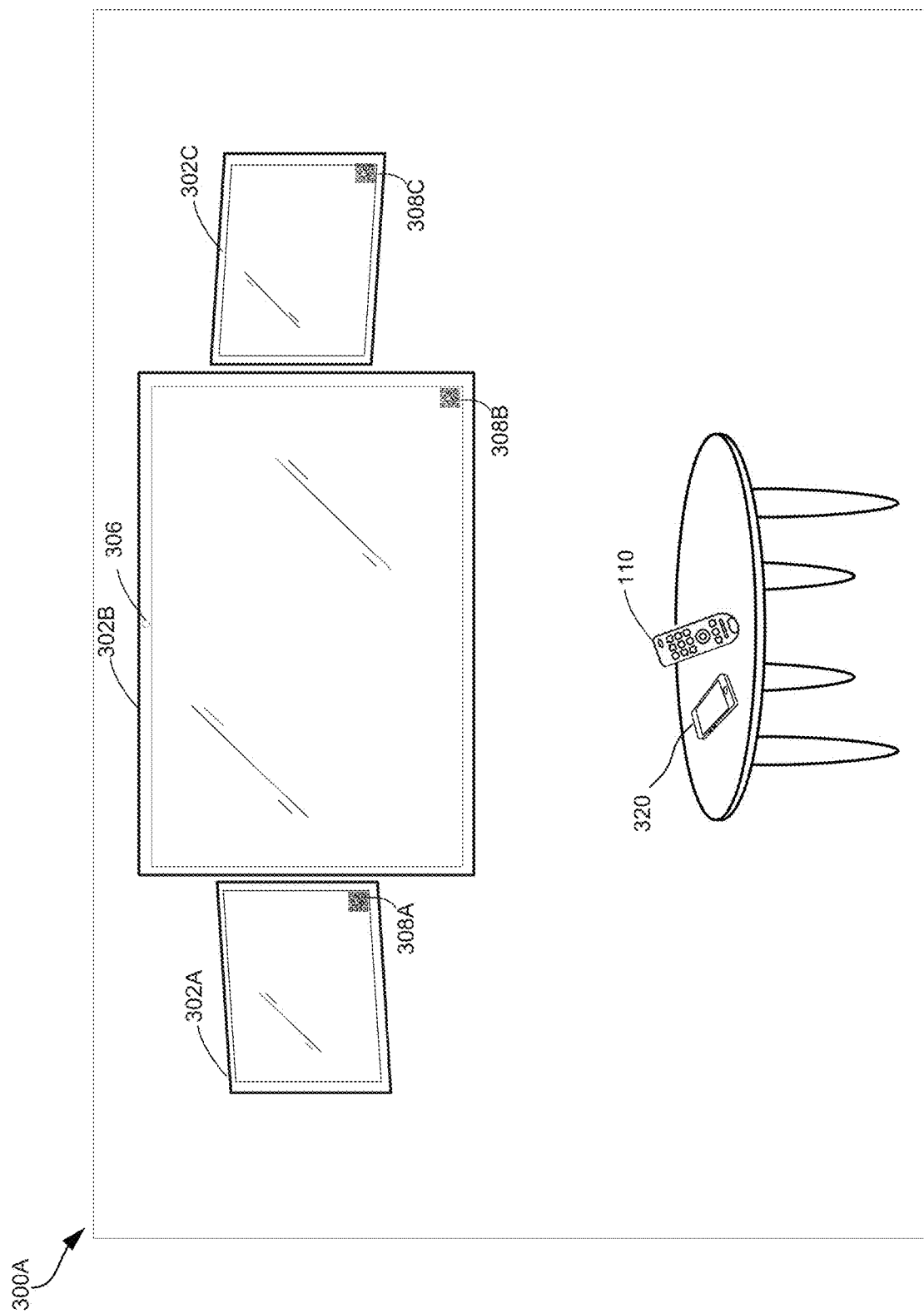
FIGS. 3A and 3B illustrate an example environment containing a display system for controlling multiple display devices with a remote control device, according to some examples of the present disclosure.
Figure 3B:
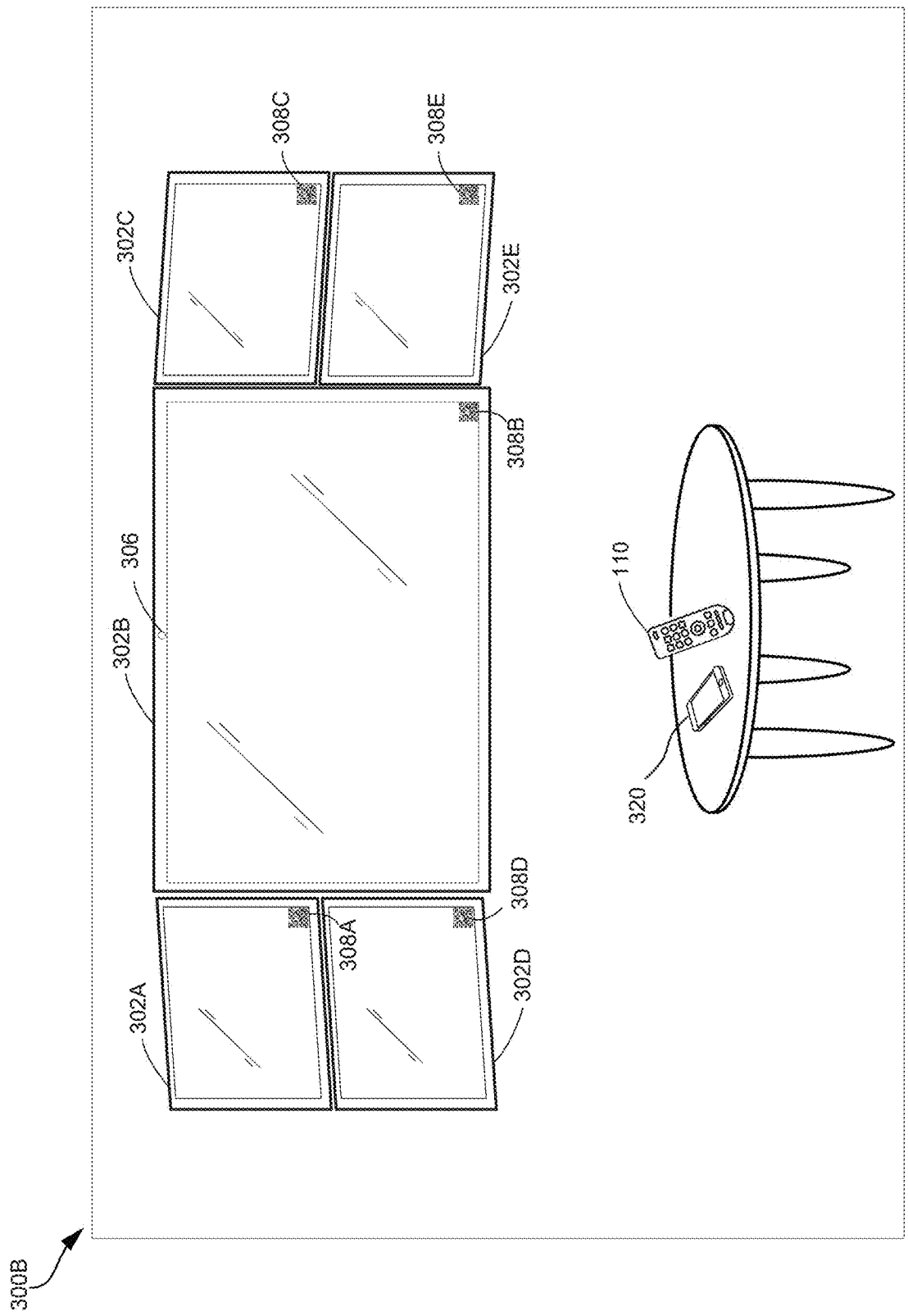

FIGS. 3A and 3B illustrate an example environment 300A, 300B containing a display system for controlling multiple display devices with a single remote control device. The example environment 300A, 300B can correspond to multimedia environment 102 as illustrated in FIG. 1, which may include a room, a classroom, a restaurant, a bar, a movie theater, a car, a plane, or any applicable place that is equipped with a display system. The display system may include multiple display devices 302A-E (similar to display device 108 as illustrated in FIG. 1) and a remote control (e.g., remote control 110).

In example environment 300A, the display system includes multiple display devices 302A, 302B, 302C and remote control 110. The display devices 302A-C can include, for example and without limitation, a monitor, a television, a computer, a smart phone, a tablet, a wearable, an appliance, an IoT device, a projector, or any applicable display device configured to present/display visual information (e.g., content 122, text, images, videos, or other graphical content) on its display panel.

As described previously, remote control 110 can be any component, part, apparatus and/or method for controlling operations or functions of display devices 302A-C. In some examples, remote control 110 can wirelessly communicate with display devices 302A-C. For example, remote control 110 may transmit various commands (e.g., a power command, a channel command, a volume command to control an audio system, etc.) to a corresponding display device using an IR signal, an RF signal, cellular, Bluetooth, or any applicable signal that is recognizable by the display device.

In some cases, in order to pair multiple display devices 302A-C with a single remote control 110, an arrangement of display devices 302A-C and/or locations of each display devices 302A-C may be determined. A user (e.g., user 132) may use a device equipped with a camera (e.g., mobile device 320, a tablet, a smartphone, a wearable, etc.) to capture an image of display devices 302A-C. In some examples, remote control 110 may include a camera, which is configured to capture an image of display devices 320A-

C. The camera can capture the image of multiple display devices 302A-C at a resolution sufficient to recognize and identify different displays and borders between the multiple display devices 302A-C.

An image of multiple display devices 302A-C can be analyzed to determine an arrangement (e.g., spatial geometry), locations, sizes, shapes, and/or borders of display devices 302A-C. In some illustrations, media system 104 or system server 126 can receive, over network 118, the image of display devices 302A-C and analyze the image to determine an arrangement and/or locations of display devices 302A-C. In some aspects, analysis of the image can be done locally at a device that is used to capture the image (e.g., mobile device 320 or remote control 110) without the need for network 118.

Based on the analysis of the image, three display devices 302A-C can be identified and assigned with a code specific to each of display devices 302A-C. That is, a unique code can be individually associated with each of display devices 302A-C, in which the unique code enables remote control 110 to independently control operations or functions of each of display devices 302A-C based on the position or motion of remote control 110. For example, when remote control 110 is pointed at display device 302A (e.g., pointed within borders of display device 302A), a unique code that is associated with display device 302A allows remote control 110 to transmit any commands to control display device 302A, for example via an IR signal or an RF signal, to be directed to display device 302A and no other display devices 302B, 302C.

In some examples, each display device 302A-C may have a QR code 308A-C, respectively. As follows, a user can use a device with a camera (e.g., mobile device 320, remote control 110, etc.) to capture the QR code 308A-C to distinctly identify each display device.

In some aspects, one or more of display device 302A-C may include a camera 306, which can be configured to take an image of remote control 110 or user 132. Based on the image of remote control 110 or user 132, a particular display device that remote control 110 is pointing to can be determined. That is, based on the image, the orientation or movement of remote control 110 or gesture of user 132 can be analyzed to determine a particular display device that user 132 intends to control with remote control 110.

In some cases, a setup process of a pairing/coupling of multiple display devices 302A-C with remote control 110 can be confirmed by displaying a confirmation page on one or more of display devices 302A-C. For example, one or more of display devices 302A-C can present a layout of identified display devices 302A-C, which can be confirmed by a user by pressing a certain button on remote control 110. In another example, each display device can show a flickering screen in different colors to confirm each display device is associated with different buttons on remote control 110. Further, user 132 can set up or define certain colors or gestures, which can be used to switch between different display devices 302A-C. For example, user 132 can set up display devices 302A-C and remote control 110 such that a certain movement/motion of remote control 110 is associated with a particular display device. For example, a wrist flick down can indicate that user 132 wants to control display device 302B, a wrist swipe to the left can indicate that user 132 wants to control display device 302A, or a wrist swipe to the right can indicate that user 132 wants to control display device 302C.

In some aspects, mobile device 320 may provide an interface configured to present a layout of display devices 302A-C and allows user 132 to remotely control operations or functions of the display system including display devices 302A-C and remote control 110. For example, an arrangement of display devices 302A-C can be mapped on a user interface of mobile device 320. A user (e.g., user 132) can select a display device, for example on a touchscreen or using a keypad of mobile device 320 and choose a command(s) or input to control the selected display device.

While the example environment 300A and other examples below refer to a display system including display devices, the systems and techniques of the present disclosure can be used with other media devices (e.g., a DVD or BLU-RAY device, video playback device, an audio player, a cable box, a digital video recording device, a speaker, etc.). That is, various types of media devices and/or display devices can be paired with a single remote control 110, which may control operations or functions of multiple media devices and/or display devices.

As illustrated in FIG. 3B, an arrangement, locations, or relative positions of display devices 302A-C may be changed so that reconfiguration of display devices 302A-E is needed. For example, two additional display devices 302D, 302E have been added and locations and relative positions of display devices 302A, 302B have been changed in example environment 300B.

In order to reconfigure the display devices 302A-E with remote control 110, a new image of display devices 302A-E may be taken, for example with mobile device 320, remote control 110, or any applicable device with a camera. Based on the new image, an updated arrangement and/or locations of display devices 302A-E can be identified. Similar to the setup process described with respect to FIG. 3A, a unique code can be associated with each of display devices 302A-E such that the code enables remote control 110 to independently control operations and functions of display devices 302A-E. In some examples, a QR code 308A-E can be used to identify each of display devices 302A-E, respectively.

Figure 4:
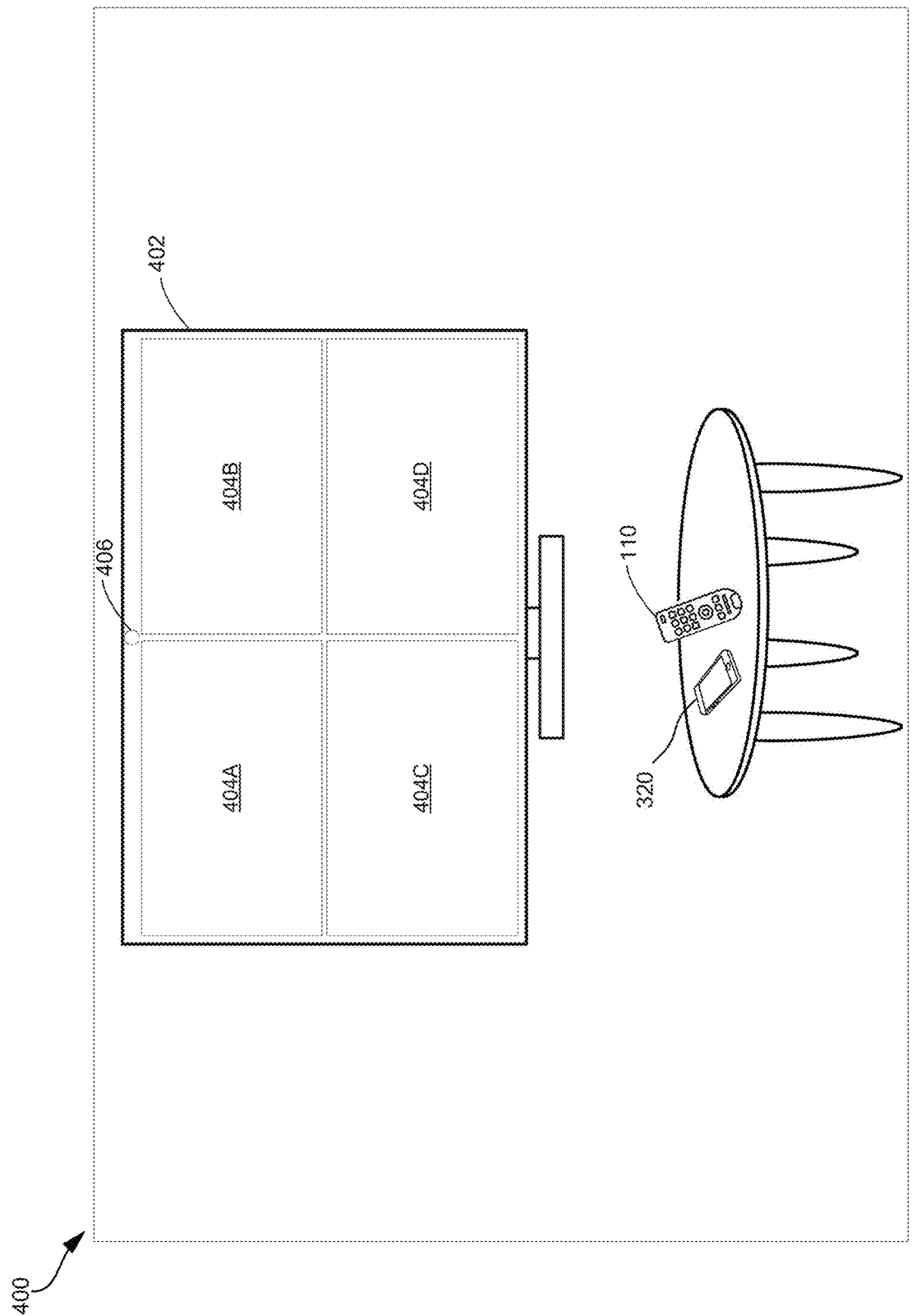
FIG. 4 illustrates an example environment containing a display system for controlling multiple displays with a remote control device, according to some examples of the present disclosure.

FIG. 4 illustrates an example environment 400 containing a display system for controlling multiple displays (e.g., multiple displays/multi-display on a single display device) with a remote control device. As illustrated, the display system in example environment 400 includes display device 402 and remote control 110. The display device 402 can simultaneously present multiple display zones 404A, 404B, 404C, 404D. That is, a display panel of display device 402 can be split into non-overlapping multiple display areas/zones (e.g., display zones 404A-D). For example, different channels or programs can be displayed simultaneously in each of the multiple display zones 404A-D on a single display device 402.

In some examples, each display zone can be assigned with a code, which enables a single remote control 110 to distinctly identify and individually operate each of display zones 404A-D. In order to assigning a code specific to each of display zones 404A-D, a user (e.g., user 132) can capture an image of display devices 402 showing multiple display zones 404A-D, for example with mobile device 320, remote control 110, or any electronic device with a camera. In some illustrations, an arrangement, locations, shape, and/or size of display zones 404A-D can be determined based on the image. In some examples, a machine learning model can be used to analyze the image to determine the arrangement, locations, shape, and/or size of display zones 404A-D.

In some examples, display device 402 may be equipped with a camera 406 or an image sensor, which may be configured to capture an image of remote control 110 or user 132 in proximity. Based on the image of remote control 110 or user 132, a particular display zone that remote control 110 is pointing to can be determined by analyzing the orientation or movement of remote control 110 or user 132.

For illustration and explanation purposes, display device 402 has four split displays 404A-D in example environment 400. However, the principles and techniques described herein can be used with any applicable number of split displays on a single display device.

Figure 5:
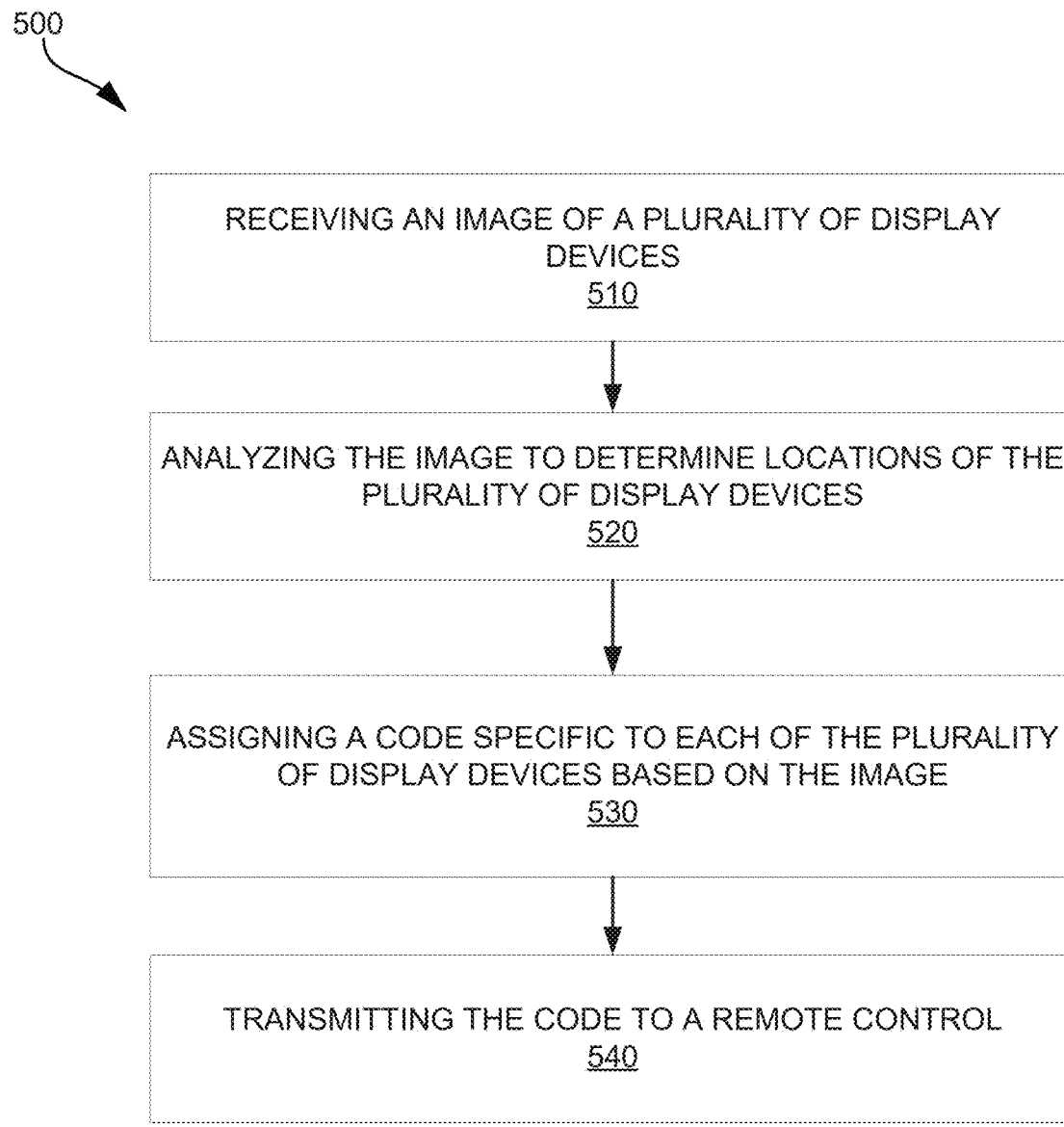
FIG. 5 illustrates a flowchart of an example method for pairing and controlling multiple display devices with a remote control device, according to some examples of the present disclosure.

FIG. 5 is a diagram illustrating a flowchart of an example method 500 for pairing multiple display devices with a remote control device, according to some examples of the present disclosure. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 500 shall be described with reference to FIGS. 1-4. However, method 500 is not limited to that example.

In step 510, method 500 includes receiving an image of a plurality of display devices. For example, media system 104 and/or system server 126 can receive an image of display devices 302A-C. The image of display devices 302A-C can be captured by mobile device 320, remote control 110, or any other electronic device that is equipped with a camera for taking an image of display devices 302A-C at a resolution sufficient to identify and distinguish different displays and/or borders between display devices 302A-C.

In step 520, method 500 includes analyzing the image to determine locations of the plurality of display devices. For example, media system 104 and/or system server 126 can analyze the image of display devices 302A-C to determine an arrangement (e.g., spatial geometry), locations, positions, shapes, sizes, and/or borders of display devices 302A-C. In some examples, media system(s) 104 or system server(s) 126 can use an algorithm, such as a machine learning algorithm (e.g., neural network), to analyze the image of multiple display devices 302A-C and determine an arrangement (e.g., spatial geometry), locations, positions, shapes, sizes, and/or borders of display devices 302A-C.

In step 530, method 500 includes assigning a code specific to each of the plurality of display devices based on the image. For example, media system 104 and/or system server 126 can assign a code specific to each of display devices 302A-C based on the image. The code assignment can include configuring remote control 110 to send specific signals (e.g., an IR signal or RF signal) that are recognized by the target display (e.g., display devices 302A-C), allowing user 132 to control its operations and functions. For example, media system 104 and/or system server 126 can associate a unique code with each of display devices 302A-C based on a position of remote control 110.

In step 540, method 500 includes transmitting the code to a remote control. The code enables the remote control to independently operate each of the plurality of display devices. For example, media system 104 and/or system server 126 can transmit the code to remote control 110 such that the code can enable remote control 110 to independently control each of display devices 302A-C.

Figure 6:
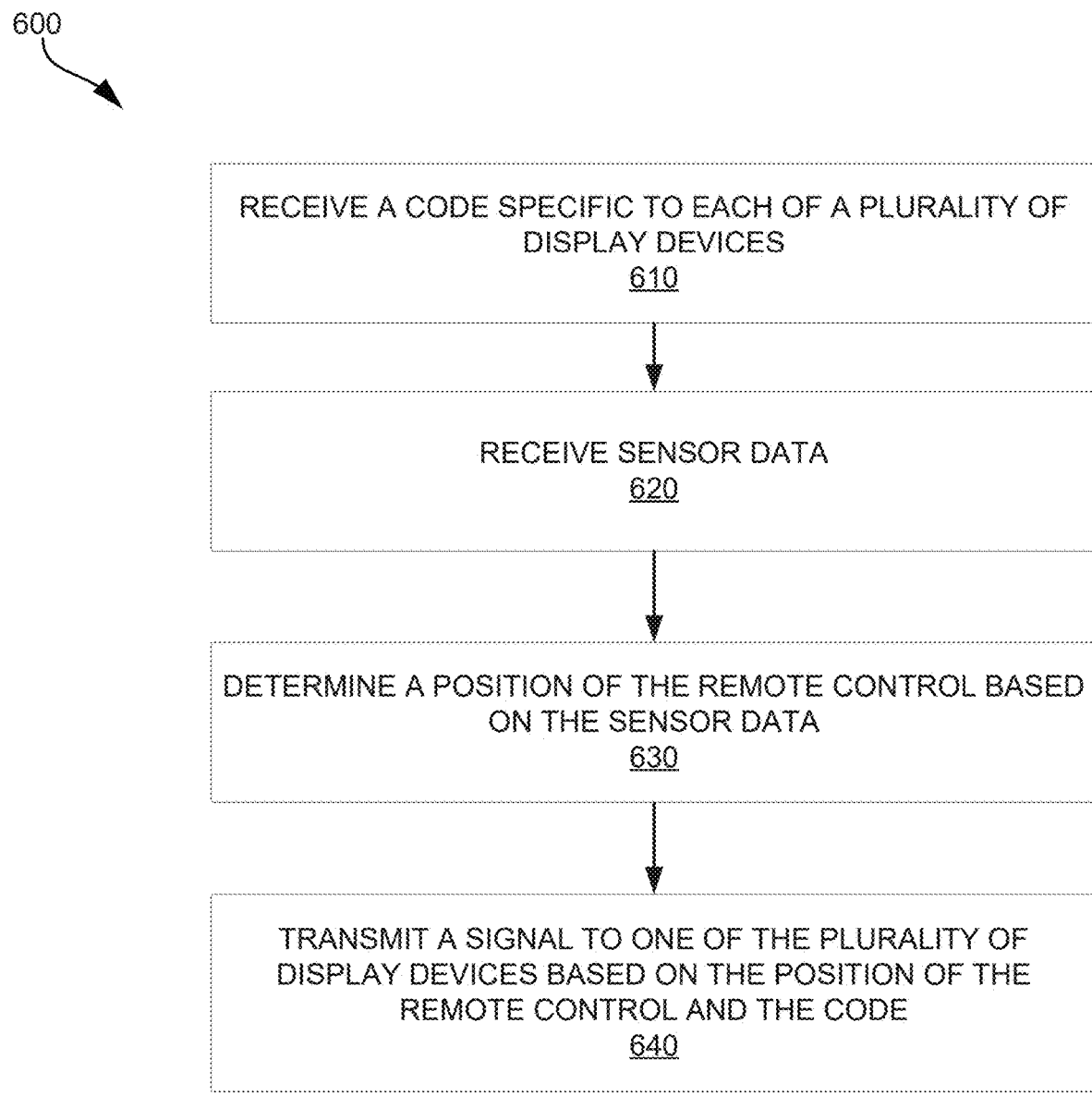
FIG. 6 illustrates a flowchart of an example method for controlling multiple display devices with a remote control based on sensor data, according to some examples of the present disclosure.

FIG. 6 is a diagram illustrating a flowchart of an example method 600 for controlling multiple display devices with a remote control based on sensor data, according to some examples of the present disclosure. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Method 600 shall be described with reference to FIGS. 1-4. However, method 600 is not limited to that example.

In step 610, method 600 includes receiving a code specific to each of a plurality of display devices. For example, remote control 110 may receive a code specific to each of display devices 302A-C from media system 104 or system server 126 as described with respect to FIG. 5.

In step 620, method 600 includes receiving sensor data associated with a remote control device. For example, remote control 110 may receive sensor data that is captured by one or more sensors of remote control 110 (e.g., a gyroscope, an accelerometer, a magnetometer, or a combination thereof). For example, gyroscope data can be used to determine orientation of remote control 110. Accelerometer data can be used to determine acceleration of remote control 110 (e.g., changes in direction). Magnetometer data can be used to determine magnetic field (e.g., orientation of remote control 110 in relation to the Earth's magnetic field).

In step 630, method 600 includes determining a position of the remote control based on the sensor data. For example, remote control 110 may determine a position of remote control 110 based on the sensor data. That is, a combination of a gyroscope, an accelerometer, or a magnetometer of remote control 110 can provide sensor data, which can be used to determine the orientation or movement/motion of remote control 110 and determine a particular display device that remote control 110 intends to control.

In some examples, remote control 110 can use motion of remote control 110 as an input such that the paired display devices (e.g., display devices 302A-C) can be switched based on a corresponding motion of remote control 110 that is defined by user 132. For example, a tilting motion or rotating motion of remote control 110 can be programmed to switch to a different display device or cycle through display devices that are available. In other examples, a certain motion can be programmed to be associated with a specific display device. For example, a wrist flick down can indicate controlling display device 302B, a wrist swipe to the left can indicate controlling display device 302A, or a wrist swipe to the right can indicate controlling display device 302C.

In step 640, method 600 includes transmitting a signal to one of the plurality of display devices based on the position of the remote control and the code. For example, remote control 110 may transmit a signal (e.g., IR signal, RF signal, or any applicable signal that is recognizable by the plurality of media devices), based on the position of remote control 110, that is recognizable by the display device. The signal can be used to deliver various commands to control operations or functions of the corresponding display device.

Figure 7:
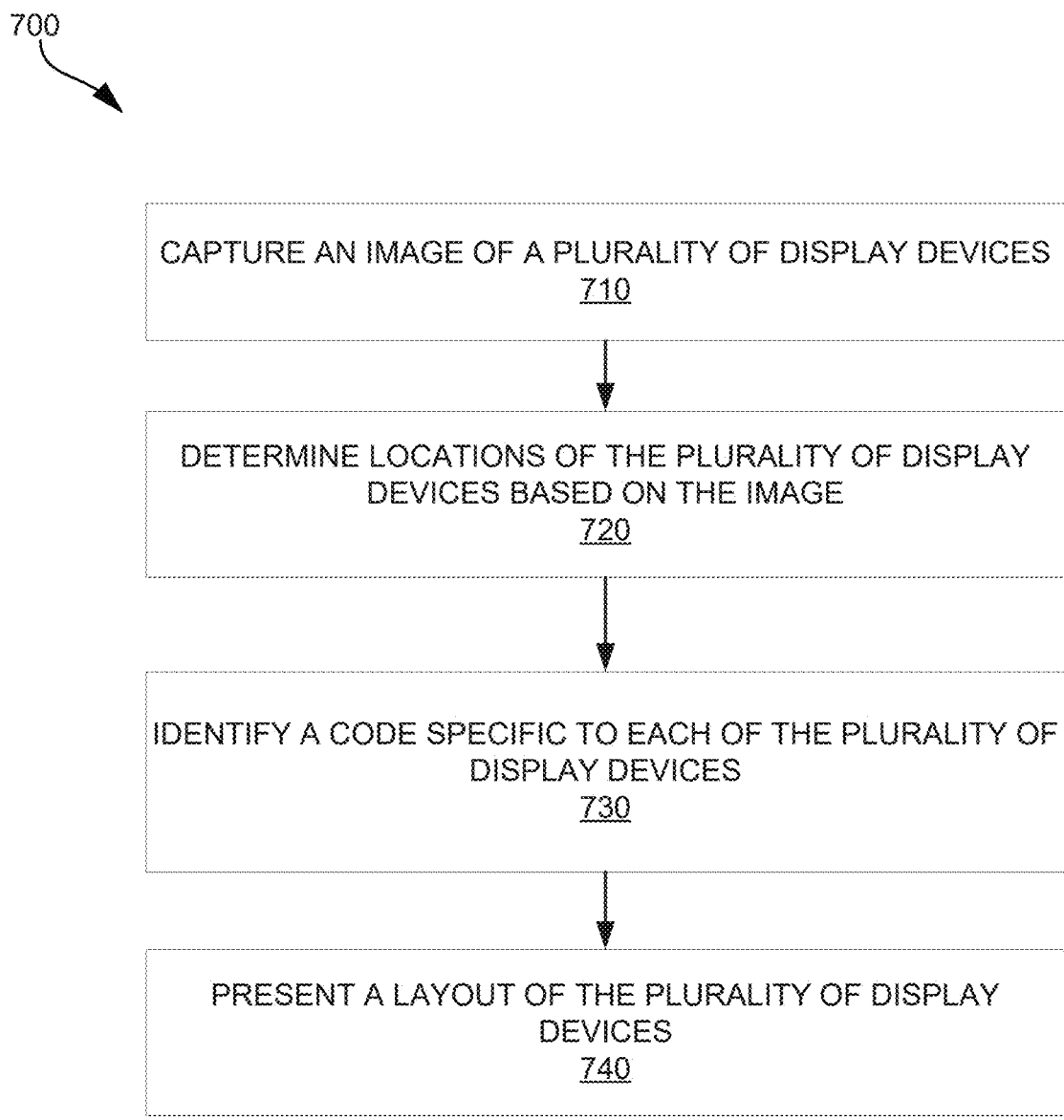
FIG. 7 illustrates a flowchart of an example method for pairing multiple display devices with a single remote control device using a mobile device, according to some examples of the present disclosure.

FIG. 7 is a diagram illustrating a flowchart of an example method 700 for pairing multiple display devices with a single remote control device using a mobile device, according to some examples of the present disclosure. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art. Method 700 shall be described with reference to FIGS. 1-4. However, method 700 is not limited to that example.

In step 710, method 700 includes capturing an image of a plurality of display devices. For example, mobile device 320 may capture an image of display devices 302A-C. Non-limiting examples of mobile device 320 can include any portable electronic device such as a mobile phone, a smartphone, a tablet, a laptop, a wearable device, a console, etc.

In step 720, method 700 includes determining locations of the plurality of display devices based on the image. For example, mobile device 320 can determine an arrangement (e.g., spatial geometry), locations, positions, sizes, shapes, borders of display devices 302A-C based on the image to distinctly identify different display zones defined by display devices 302A-C.

In step 730, method 700 includes identifying a code specific to each of the plurality of display devices. For example, mobile device 320 can identify a code specific to each of display devices 302A-C.

In step 740, method 700 includes presenting a layout of the plurality of display devices. For example, mobile device 320 can provide an interface for presenting a layout of display devices 302A-C. The mobile device 320 can further provide a user interface, which allows user remotely control operations or functions of display devices 302A-C. For example, user 132 can select a display device on the user interface of mobile device 320 such that user 132 can choose any commands (e.g., a power command, a channel command, a volume command to control an audio system, etc.) as user 132 desires.

Example Computer System

Figure 8:
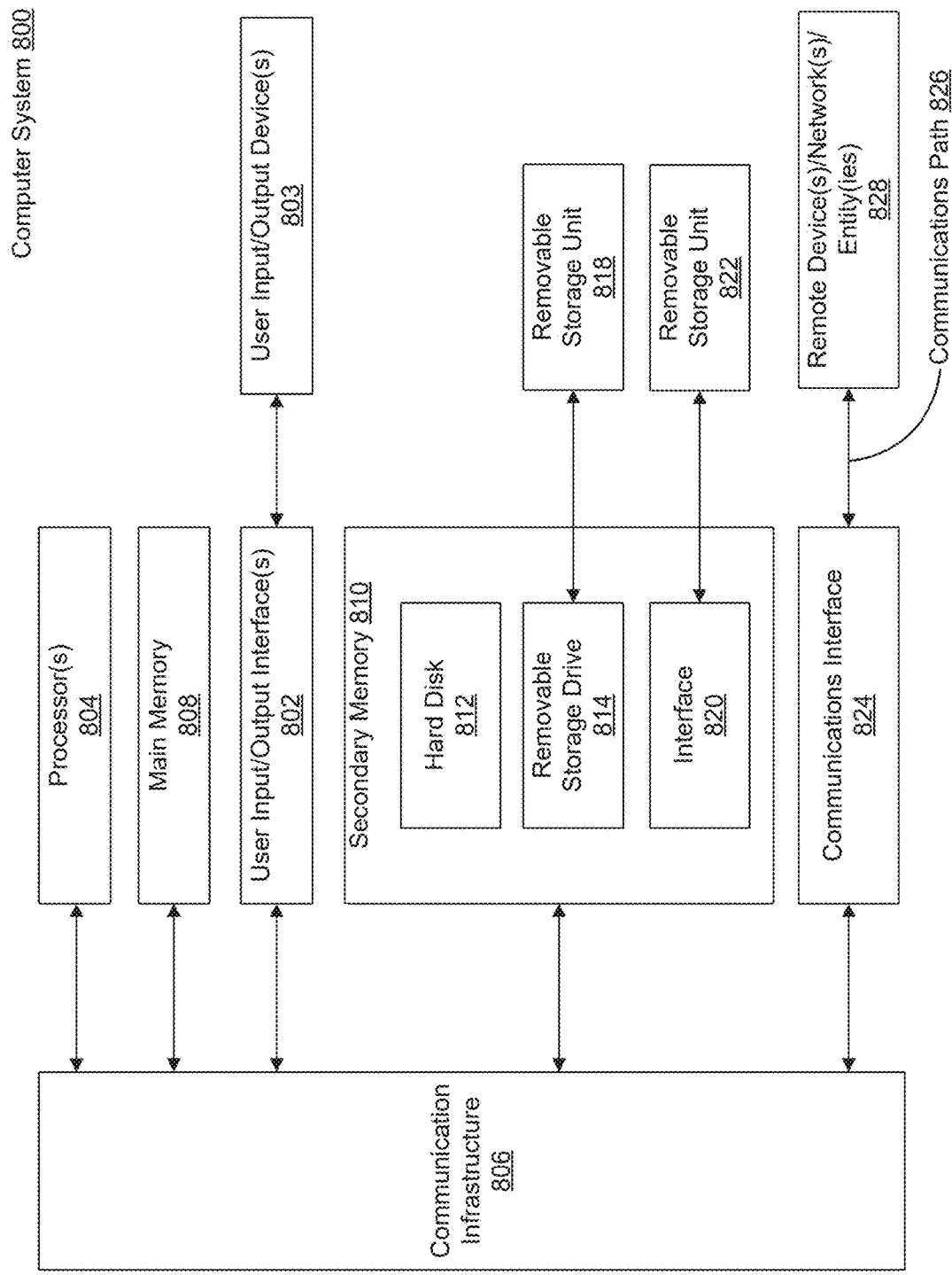
FIG. 8 illustrates an example computer system that can be used for implementing various aspects of the present disclosure.

Various aspects and examples may be implemented, for example, using one or more well-known computer systems, such as computer system 800 shown in FIG. 8. For example, the media device 106, display device 108, or remote control 110 may be implemented using combinations or sub-combinations of computer system 800. Also or alternatively, one or more computer systems 800 may be used, for example, to implement any of the aspects and examples discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In some examples, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (e.g., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 800 may include a communication or network interface 24. Communication interface 824 may enable computer system 800 to communicate and interact with any combination of external devices, external networks, external entities, etc. (individually and collectively referenced by reference number 288). For example, communication interface 824 may allow computer system 800 to communicate with external or remote devices 828 over communications path 826 which may be wired and/or wireless (or a combination thereof), and which may include any combination of LANs, WANs, the Internet, etc. Control logic and/or data may be transmitted to and from computer system 800 via communications path 826.

Computer system 80 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some examples, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800 or processor(s) 804), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising: one or more memories; and at least one processor coupled to at least one of the one or more memories and configured to perform operations comprising: receiving an image of a plurality of display devices; analyzing the image to determine locations of the plurality of display devices; assigning a code specific to each of the plurality of display devices based on the image; and transmitting the code to a remote control, wherein the code enables the remote control to independently operate each of the plurality of display devices.

Aspect 2. The system of Aspect 1, wherein assigning the code specific to each of the plurality of display devices further comprises: associating a unique code with each of the plurality of display devices based on a position of the remote control.

Aspect 3. The system of any of Aspects 1 to 2, wherein the code enables the remote control to independently operate each of the plurality of display devices via an infrared (IR) signal or radio frequency (RF) signal that is recognizable by the plurality of display devices.

Aspect 4. The system of any of Aspects 1 to 3, wherein the at least one processor is configured to perform operations comprising: determining, using a machine learning model, positions and orientations of the plurality of display devices.

Aspect 5. The system of any of Aspects 1 to 4, wherein the at least one processor is configured to perform operations comprising: determining, using a machine learning model, borders of each of the plurality of display devices.

Aspect 6. The system of any of Aspects 1 to 5, wherein the at least one processor is configured to perform operations comprising: determining relative locations between the plurality of display devices.

Aspect 7. The system of any of Aspects 1 to 6, wherein the at least one processor is configured to perform operations comprising: receiving a second image of at least a portion of the plurality of display devices; determining a change in an arrangement of the plurality of display devices; and reconfiguring the code based on the change in the arrangement of the plurality of display devices.

Aspect 8. The system of any of Aspects 1 to 7, wherein the code is related to a position of the remote control, which is determined based on sensor data comprising at least one of gyroscope data, accelerometer data, and magnetometer data associated with the remote control.

Aspect 9. The system of any of Aspects 1 to 8, wherein the image is received from a mobile device that is operated by a user.

Aspect 10. The system of any of Aspects 1 to 9, wherein the at least one processor is configured to perform operations comprising: presenting a layout of the plurality of display devices on an interface associated with the remote control.

Aspect 11. A computer-implemented method comprising: receiving an image of a plurality of display devices; analyzing the image to determine locations of the plurality of display devices; assigning a code specific to each of the plurality of display devices based on the image; and transmitting the code to a remote control, wherein the code enables the remote control to independently operate each of the plurality of display devices.

Aspect 12. The method of Aspect 11, wherein assigning the code specific to each of the plurality of display devices further comprises: associating a unique code with each of the plurality of display devices based on a position of the remote control.

Aspect 13. The method of any of Aspects 11 to 12, wherein the code enables the remote control to independently operate each of the plurality of display devices via an infrared (IR) signal or radio frequency (RF) signal that is recognizable by the plurality of display devices.

Aspect 14. The method of any of Aspects 11 to 13, further comprising: determining, using a machine learning model, positions and orientations of the plurality of display devices.

Aspect 15. The method of any of Aspects 11 to 14, further comprising: determining, using a machine learning model, borders of each of the plurality of display devices.

Aspect 16. The method of any of Aspects 11 to 15, further comprising: determining relative locations between the plurality of display devices.

Aspect 17. The method of any of Aspects 11 to 16, further comprising: receiving a second image of at least a portion of the plurality of display devices; determining a change in an arrangement of the plurality of display devices; and reconfiguring the code based on the change in the arrangement of the plurality of display devices.

Aspect 18. The method of any of Aspects 11 to 17, wherein the code is related to a position of the remote control, which is determined based on sensor data comprising at least one of gyroscope data, accelerometer data, and magnetometer data associated with the remote control.

Aspect 19. The method of any of Aspects 11 to 18, wherein the image is received from a mobile device that is operated by a user.

Aspect 20. A non-transitory computer-readable medium having instructions stored thereon that, when executed by at least one computing device, cause the at least one computing device to perform a method according to any of Aspects 11 to 19.

Aspect 21. A system comprising means for performing a method according to any of Aspects 11 to 19.

Aspect 22. A computer program product having stored thereon instructions which, when executed by one or more processors, cause the one or more processors to perform a method according to any of Aspects 11 to 19.

What is claimed is:

1. A computing system comprising:
a memory storing instructions; and
at least one processor coupled to the memory, the at least one processor being configured to execute the instructions to:
receive an image of a plurality of display devices;
analyze the image to determine locations of the plurality of display devices;
assign a code specific to each of the plurality of display devices based on the image, the code enabling a remote control to independently operate each of the plurality of display devices;
transmit the code to the remote control;
determine a position of a remote control relative to each of the plurality of display devices; and
determine a target display device for the remote control to control based on the position of the remote control relative to each of the plurality of display devices.

2. The computing system of claim 1, wherein the code enables the remote control to independently operate each of the plurality of display devices via an infrared (IR) signal or radio frequency (RF) signal that is recognizable by the plurality of display devices.

3. The computing system of claim 1, wherein the at least one processor is configured to perform operations comprising:
determining, using a machine learning model, positions and orientations of the plurality of display devices.

4. The computing system of claim 1, wherein the at least one processor is configured to perform operations comprising:
determining, using a machine learning model, borders of each of the plurality of display devices.

5. The computing system of claim 1, wherein the at least one processor is configured to perform operations comprising:
determining relative locations between the plurality of display devices.

6. The computing system of claim 1, wherein the at least one processor is configured to perform operations comprising:
receiving a second image of at least a portion of the plurality of display devices;
determining a change in an arrangement of the plurality of display devices; and
reconfiguring the code based on the change in the arrangement of the plurality of display devices.

7. The computing system of claim 1, wherein the code is related to the position of the remote control, which is determined based on sensor data comprising at least one of gyroscope data, accelerometer data, and magnetometer data associated with the remote control.

8. The computing system of claim 1, wherein the image is received from a mobile device that is operated by a user.

9. The computing system of claim 1, wherein the at least one processor is configured to perform operations comprising:
presenting a layout of the plurality of display devices on an interface associated with the remote control.

10. A computer-implemented method comprising:
receiving an image of a plurality of display devices;
analyzing the image to determine locations of the plurality of display devices;

assigning a code specific to each of the plurality of display devices based on the image, the code enabling a remote control to independently operate each of the plurality of display devices;

transmitting the code to the remote control;

determining a position of a remote control relative to each of the plurality of display devices; and determining a target display device for the remote control to control based on the position of the remote control relative to each of the plurality of display devices.

11. The computer-implemented method of claim 10, wherein the code enables the remote control to independently operate each of the plurality of display devices via an infrared (IR) signal or radio frequency (RF) signal that is recognizable by the plurality of display devices.

12. The computer-implemented method of claim 10, further comprising:

determining, using a machine learning model, positions and orientations of the plurality of display devices.

13. The computer-implemented method of claim 10, further comprising:

determining, using a machine learning model, borders of each of the plurality of display devices.

14. The computer-implemented method of claim 10, further comprising:

determining relative locations between the plurality of display devices.

15. The computer-implemented method of claim 10, further comprising:

receiving a second image of at least a portion of the plurality of display devices;

determining a change in an arrangement of the plurality of display devices; and reconfiguring the code based on the change in the arrangement of the plurality of display devices.

16. The computer-implemented method of claim 10, wherein the code is related to the position of the remote control, which is determined based on sensor data comprising at least one of gyroscope data, accelerometer data, and magnetometer data associated with the remote control.

17. The computer-implemented method of claim 10, wherein the image is received from a mobile device that is operated by a user.

18. A non-transitory computer-readable medium having instructions stored thereon that, when executed by at least one computing device, cause the at least one computing device to perform operations comprising:

receiving an image of a plurality of display devices;

analyzing the image to determine locations of the plurality of display devices;

assigning a code specific to each of the plurality of display devices based on the image, the code enabling a remote control to independently operate each of the plurality of display devices;

transmitting the code to the remote control;

determining a position of a remote control relative to each of the plurality of display devices; and determining a target display device for the remote control to control based on the position of the remote control relative to each of the plurality of display devices.

\* \* \* \* \*